Dec. 27, 1938.    H. FEILKAS    2,141,429
FLUID CONTROL SYSTEM FOR HYDRAULIC MOTORS
Filed March 4, 1937    2 Sheets-Sheet 1
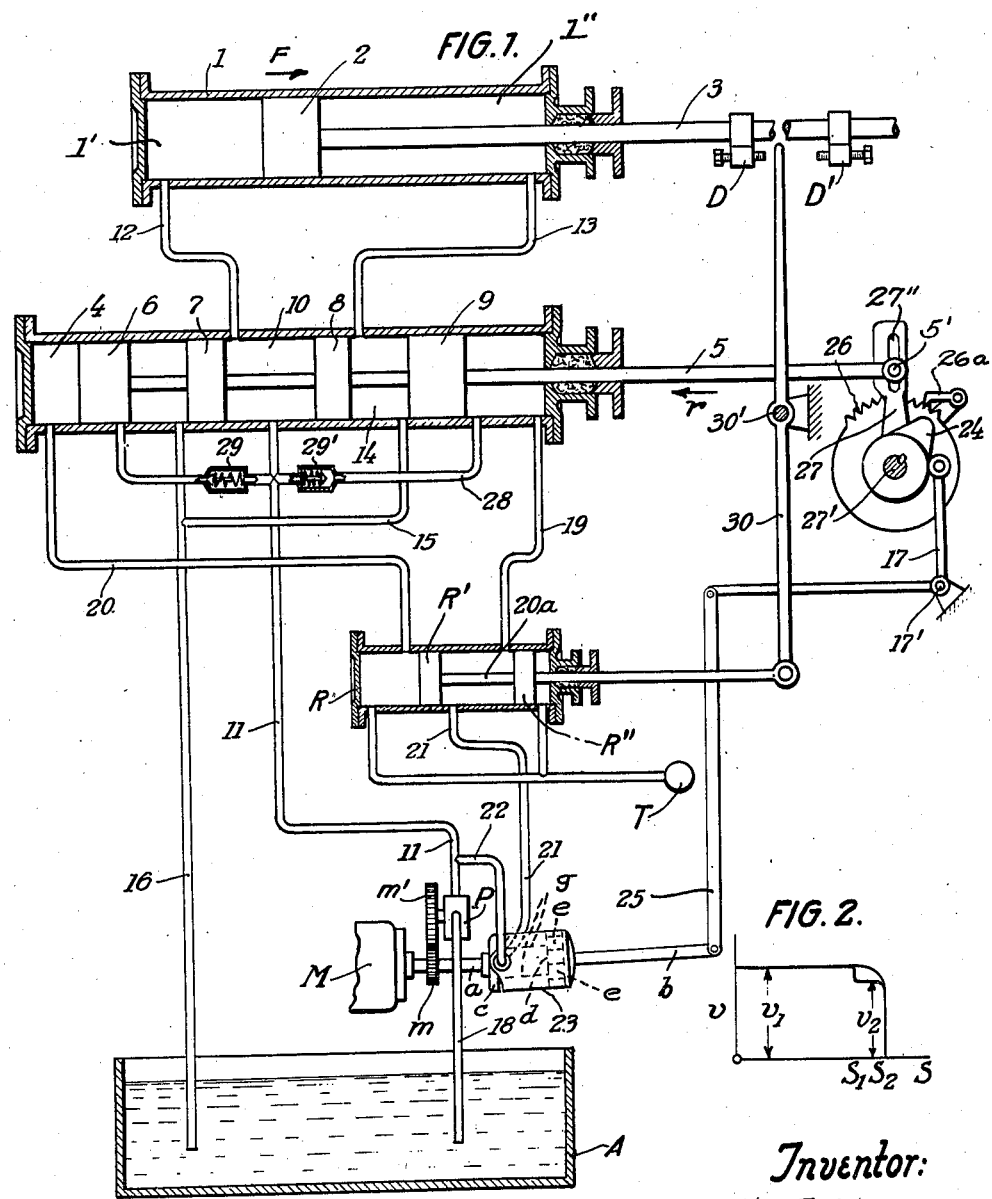
Inventor:
H. Feilkas
By: Glascock Downing & Seebold, Attys.

Dec. 27, 1938.    H. FEILKAS    2,141,429

FLUID CONTROL SYSTEM FOR HYDRAULIC MOTORS

Filed March 4, 1937    2 Sheets-Sheet 2

Inventor:
H. Feilkas

Glascock Downing & Seebold
by    Attorneys

Patented Dec. 27, 1938

2,141,429

UNITED STATES PATENT OFFICE 2,141,429

FLUID CONTROL SYSTEM FOR HYDRAULIC MOTORS

Heinrich Feilkas, Offenbach-on-the-Main, Germany, assignor to Lange & Geilen, Halle-on-the-Saale, Germany Application March 4, 1937, Serial No. 129,051
In Germany May 15, 1935

9 Claims. (Cl. 60—52)

My invention relates to fluid control systems for hydraulic motors, and more particularly to systems of that type in which reciprocation is imparted to a movable member by a fluid regulated by pilot means operatively connected to the reciprocating member, and by reversing means under the control of the pilot means. The fluid is supplied under pressure by a pump whose delivery pipe, a space defined by the reversing means, and a pair of pipes connecting opposite sides of the movable member, make up what will be termed the "principal conduit". A "subsidiary conduit" includes the pilot means, another space in the reversing means, and a pipe connected to the delivery pipe and to the pilot means, for diverting a portion of the flow in the principal conduit to the subsidiary conduit. The volume of the diverted flow is determined by a throttle valve ahead of the pilot means.

In this known fluid control system, the volume diverted is constant, and the diversion occurs instantaneously so that the velocity of the movable member is reduced abruptly. The piston moves on at this reduced velocity until it is at the end of its stroke.

It is an object of my invention to improve a fluid control of this type so that the velocity of the movable member is reduced gradually, and not abruptly, near the end of its stroke.

To this end, instead of the throttle valve referred to, I provide a metering device under the control of the reciprocating member for varying the flow in the subsidiary conduit, and thereby the volume which is diverted from the flow of the pump.

Preferably the metering device is designed as a variable-delivery pump, and mechanism operatively connected to the reversing means is provided for regulating the delivery of the pump.

In the accompanying drawings, I have illustrated, more or less diagrammatically and by way of example, a fluid control system of a hydraulic cylinder for reciprocating the table of a high-speed planer.

In the drawings:

Fig. 1 is a diagrammatic elevation of my system,

Fig. 2 is a chart illustrating its operation, and

Figure 3:
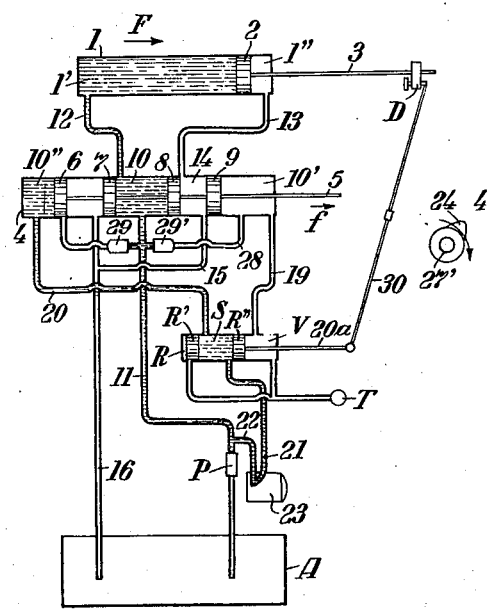
Figure 4:
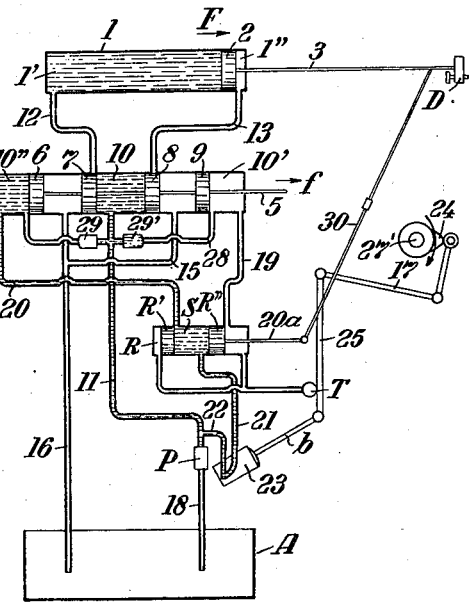
Figure 5:
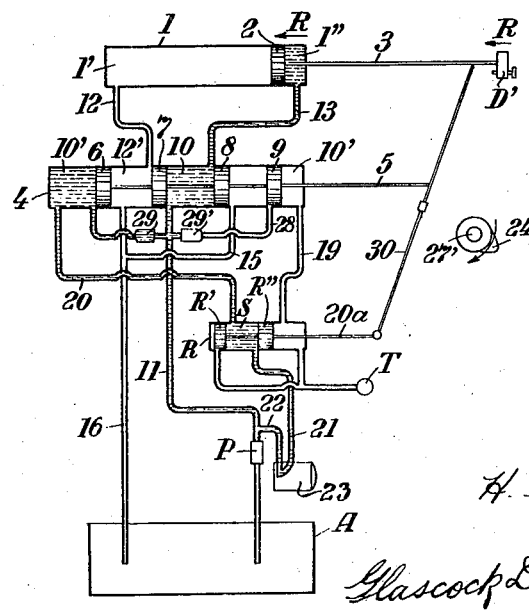

Figs. 3, 4, and 5 are diagrams illustrating the operation of the system during the reversing period.

Referring now to the drawings, and first to Fig. 1, A is a reservoir for the operating liquid which in the present instance is lubricating oil, but obviously may be water, or any other suitable liquid.

P is the principal pump which draws the oil from the reservoir A and delivers it to the fluid control system through pipe 11. Oil which has performed its function, is returned to the reservoir A through a waste pipe 16. Rotation is imparted to the principal pump P by any suitable means, for instance, an electric motor M. The motor, through a pinion $m$ on its own shaft $a$, and a spur gear $m'$ on the shaft of the principal pump P, imparts rotation to the principal pump P whose suction pipe 18 extends down into the reservoir A. 23 is the metering device or subsidiary pump whose suction side is connected to the delivery pipe 11 of the principal pump by a branch pipe 22. The delivery pipe 21 of the subsidiary pump 23 extends to the cylinder R of a pair of pilot valves R' and R", as will be described in detail below. The casing of the subsidiary pump is hinged at one end, where the pipes 21 and 22 are connected to it, and is raised and lowered by a link 25 engaging a rod $b$ on the casing, as will also be described in detail. The metering device, or subsidiary pump, 23 is of the variable-delivery type. Such pumps are old in the art, and any suitable kind of pump may be employed here. In the present instance, the pump 23 is equipped with a plate $c$ keyed on its shaft $a$ which is also the shaft of motor M, and with a cylinder body $d$ in its casing. Pistons $e$ are mounted to slide in bores of the body $d$ and their rods $g$ are pivotally connected to the plate $c$.

Fig. 1 shows the metering device, or subsidiary pump, 23, in its lowermost, or normal position in which it is slightly inclined in upward direction and its delivery is a minimum, and when it is in its topmost position, the delivery is a maximum.

1 is the power cylinder in which the piston 2, the "reciprocating member" referred to above, is mounted to slide. The rod 3 of the piston 2 projects from the cylinder 1 through suitable packing means and is connected to the table of the high-speed planer. The table and the means by which it is connected to the piston rod, have not been illustrated. Mounted on the piston rod 3 are two adjustable dogs D and D' whose purpose will be explained below. Pipes 12 and 13 connect the ends of the power cylinder 1 to the reversing means which comprise a cylinder 4. Four pistons, 6, 7, 8, and 9, are enclosed in the intermediate cylinder 4 and secured, in spaced relation, on a single piston rod 5. The delivery pipe 11 of the principal pump P opens into the cylinder 4 substantially at its centre. Pipes 19 and 20 connect the ends of the reversing cylinder to ports near the ends of the pilot cylinder R. In addition, counting from the rear end of the cylinder 4, the following pipes open into this cylinder: The rear end of an equalizing pipe 28, which is connected to the delivery pipe 11 of the principal pump and has check valves 29, 29' at opposite sides of the delivery pipe 11; the waste pipe 16; the rear connecting pipe 12 to the power cylinder 1; the delivery pipe 11; a branch pipe 15 leading to the waste pipe 16; the front connecting pipe 13; the front end of the equalizing pipe 28.

The pipes 19 and 20 open at opposite ends of the pilot cylinder R in which two pilot pistons R' and R'' are seated on a piston rod 20a. The ends of the pilot cylinder R can be connected to a distributor T, if desired, from which branch pipes, not shown, extend to the several lubricating stations of the planer.

The outer end of the reversing piston rod 5 is provided with a pin 5' engaging in a slot 27'' of an arm 27 on a shaft 27', and a cam 24 is keyed on this shaft. The cam cooperates with a roller at the upper end of the vertical arm of a bell crank 17 fulcrumed at 17' whose horizontal arm supports the upper end of the link 25, already referred to whose lower end is connected to the rod b, for moving the subsidiary pump 23 about its hinge. A pawl-and-ratchet mechanism 26, 26a may be mounted on the shaft 27' for feeding the planer table through suitable means, not shown.

The outer end of the pilot piston rod 20a is connected to the lower end of a double-armed reversing lever 30 which is fulcrumed at 30' and whose upper end projects into the path of the adjustable dogs D, D' on the power piston rod 3. The upper end of the reversing lever is equipped with means, not shown, for instance, a spring catch, for allowing the rear dog D and the power piston 2 to move on in the forward direction after the dog D has thrown over the reversing lever 30 and moved the pilot pistons R' and R'' into the position shown in Fig. 3.

Fig. 1 shows the position occupied by the parts of the system when the power piston 2 has almost completed its forward stroke in the direction F and the rear dog D on its piston rod 3 is about to strike, and throw over, the reversing lever 30. It will be understood that the parts have been moved into this position by the front dog D' striking the reversing lever 30 upon the preceding return stroke of the piston. The principal conduit is established by delivery pipe 11, the space 10 between the inner pistons 7, 8 of the reversing cylinder 4, and the pipe 12 opening into the space 1' at the rear of the power cylinder 1. The liquid from pipe 12 pushes the power piston in the forward direction, and the liquid in the space 1'' before the piston 2 is expelled through pipe 13, space 14 between the pistons 8, 9, branch 15, and waste pipe 16 back to reservoir A. The subsidiary conduit comprises the pipe 22, the subsidiary pump 23, in the position of minimum delivery at the time, pipe 21, space S between pilot pistons R' and R'', and pipe 19. The four pistons in the reversing cylinder 4 are pushed to the rear in the direction r, the front face of piston 9 exposing the front opening of pipe 28, whereupon the check valve 29' opens, and the body of piston 6 closes the rear opening of the pipe 28, the valve 29 remaining on its seat. The two check valves prevent liquid from flowing into the pipe 28 from the delivery pipe 11 of the principal pump P. The roller at the upper end of bellcrank 17 is still on the concentric portion of the cam 24.

Referring now to the diagrams Figs. 3, 4, and 5, it should be noted that these pipes and those spaces in the several cylinders in which oil under pressure is present, have been shaded.

Fig. 3 shows the position in which the power piston 2 is near the end of its forward stroke F and has just reversed the lever 30 through the rear dog D. The pilot pistons R' and R'' are shifted to the rear and oil flows from the delivery pipe 21 of the variable-delivery pump, or metering device, 23 to the rear space 10'' of the reversing cylinder 4 through the space S between the pilot pistons R' and R'', and the pipe 20. The pump 23 is still in its position of minimum delivery. The oil in 10'' gradually pushes the reversing pistons 6 to 9 to the right in the direction f, but for the present the space 10 is still connected to the pipe 12 so that the oil in the principal conduit and in the space 1' of power cylinder still pushes the power piston 2 forward. The space 1'' in front of the advancing piston 2 is connected to the waste pipe 16 through pipe 13, the space 14 between the reversing pistons 8 and 9, and the pipe 15. This position corresponds to the position in the known system referred to above, in which the fluid is partly, and abruptly, diverted through the throttle valve. In the novel system, on the other hand, the diversion begins quite gradually. The piston rod 5 of the reversing cylinder 4, in moving in the direction f, turns the cam 24 clockwise through the arm 27, and its eccentric portion now begins to act on the roller at the upper end of the bellcrank lever 17 and to move the subsidiary pump 23 from its position of minimum delivery to that of maximum delivery. As the delivery of the subsidiary pump 23 increases, an increasing amount of oil is diverted from the flow in the principal circuit by the suction pipe 22 of the subsidiary pump 23, the flow to the space 1' is reduced in proportion and the velocity of the piston 2 is reduced but not abruptly, as in the known system, as the diverted flow gradually increases.

In Fig. 4, the rear dog D has moved beyond the end of the reversing lever after having deflected its spring catch, or the like. At the same time, the power piston 2 has arrived at the front end of its stroke in the direction F, the reversing pistons 7 and 8 have blocked the ports of pipes 12 and 13 in the cylinder 4, and their piston rod 5 which still advances in the direction f, has turned the cam 24 so far that its eccentric portion has elevated the subsidiary pump 23 into the topmost position of maximum delivery and maximum flow diversion from pipe 11. The power piston 2 is now abruptly arrested. Water hammer effects are avoided by providing safety valves, not shown, on the pipes 12 and 13.

In this manner the diversion from the flow to the piston 2 is gradually increased, and the velocity of the piston is gradually reduced, during the deceleration period, i. e., the time which elapses from the moment the lever 30 is reversed as in Fig. 3, to the moment the working piston 2 is arrested, Fig. 4.

When the reversing pistons 6 to 9 have attained their final position to the right, Fig. 5, the inner pistons 7 and 8 have moved so far in the direction f that now the space 10 between them is connected to the pipe 13 and oil under pressure is admitted to the space 1'' in front of the working piston which now starts for its return stroke R. The eccentric portion of cam 24 has moved past the roller at the end of bellcrank 17 and the subsidiary pump 23 has been returned into its position of minimum delivery. During the return stroke of the power piston 2, the front dog D' returns the reversing lever 30 into the position shown in Fig. 1, the returning piston is decelerated by diversion from the flow to space 1'', it being understood that the reversing lever 30 must have another spring catch for cooperation with dog D' allowing the dog to move on after it has thrown over the reversing lever, and finally the piston is arrested and reversed by operations quite similar to those described.

Referring now to Fig. 2, velocities of a high-speed planer table are plotted against stroke. The chart shows the conditions toward the end of a forward stroke of the table. The velocity for the distance $S_1$ is constant and is $V_1$. The reversal is started at $S_1$ as shown in Fig. 3. If instead of the metering device 23 only a throttle valve were provided, as in the known gear referred to, the velocity would abruptly fall to $V_2$ at $S_1$ and remain so until it becomes nil at the end $S_2$ of the stroke. However, since the delivery of the subsidiary pump 23 is varied as described, by means of cam 24, bellcrank 17, and rod 25, the velocity gradually decreases from $V_1$ to nil, as shown by the curved line until the piston 2 is arrested by the reversing pistons 7 and 8 blocking the pipes 12 and 13. Point S of the chart corresponds to Fig. 4. Conditions are reversed in the return movement of the table.

It is understood that my invention is by no means limited to the design and structures described by way of example only, nor to its application to a planer table, nor to oil, or any other particular liquid, for operating the fluid control system, but that it may be modified in various ways without departing from its gist.

I claim:

1. In a fluid control system for hydraulic motors, a reciprocating member, pilot means operatively connected to the reciprocating member, a pump, a principal conduit connecting the delivery side of the pump to the reciprocating member, means arranged in the principal conduit under the control of the pilot means for reversing the reciprocating member, a subsidiary conduit connecting the delivery side of the pump to the pilot means, and a metering device arranged in the subsidiary conduit under the control of the reversing means for partly diverting the flow in the principal conduit.

2. In a fluid control system for hydraulic motors, a reciprocating member, pilot means operatively connected to the reciprocating member, a pump, a principal conduit connecting the delivery side of the pump to the reciprocating member, means arranged in the principal conduit under the control of the pilot means for reversing the reciprocating member, a subsidiary conduit connecting the delivery side of the pump to the pilot means, a metering device arranged in the subsidiary conduit for partly diverting the flow in the principal conduit, and mechanism operatively connected to the reversing means for regulating the diverting action of the metering device.

3. In a fluid control system for hydraulic motors, a reciprocating member, pilot means operatively connected to the reciprocating member, a principal pump, a principal conduit connecting the delivery side of the principal pump to the reciprocating member, means arranged in the principal conduit under the control of the pilot means for reversing the reciprocating member, a subsidiary conduit connecting the delivery side of the principal pump to the pilot means, a subsidiary pump operatively connected to the principal pump and arranged in the subsidiary conduit for partly diverting the flow in the principal conduit, and mechanism operatively connected to the reversing means for regulating the diverting action of the subsidiary pump.

4. In a fluid control system for hydraulic motors, a reciprocating member, pilot means operatively connected to the reciprocating member, a principal pump, a principal conduit connecting the delivery side of the principal pump to the reciprocating member, means arranged in the principal conduit under the control of the pilot means for reversing the reciprocating member, a subsidiary conduit connecting the delivery side of the principal pump to the pilot means, a subsidiary pump operatively connected to the principal pump and arranged in the subsidiary conduit for partly diverting the flow in the principal conduit, and mechanism operatively connected to the reversing means for regulating the delivery of the subsidiary pump.

5. In a fluid control system for hydraulic motors, a reciprocating member, pilot means operatively connected to the reciprocating member, a principal pump, a principal conduit connecting the delivery side of the principal pump to the reciprocating member, means arranged in the principal conduit under the control of the pilot means for reversing the reciprocating member, a subsidiary conduit connecting the delivery side of the principal pump to the pilot means, a subsidiary pump operatively connected to the principal pump and arranged in the subsidiary conduit for partly diverting the flow in the principal conduit, and mechanism operatively connected to the reversing means for first increasing, and then reducing, the delivery of the subsidiary pump.

6. In a fluid control system for hydraulic motors, a reciprocating member, pilot means operatively connected to the reciprocating member, a principal pump for supplying fluid under pressure to the reciprocating member, reversing means under the control of the pilot means for reversing the flow of the fluid to the reciprocating member, and a variable-delivery subsidiary pump arranged to divert to the pilot means a metered and variable quantity from the fluid supplied by the principal pump.

7. In a fluid control system for hydraulic motors, a principal pump, means for operating the principal pump, a principal conduit connected to the principal pump, a subsidiary pump operatively connected to the principal pump, a subsidiary conduit branched from the principal conduit and connected to the suction side of the subsidiary pump, a power cylinder, a piston in the cylinder, hydraulic pilot means connected to the delivery side of the subsidiary pump, means controlled by the piston for operating the pilot means in time with the reciprocation of the piston, a hydraulic reversing member connected to the principal conduit, to the power cylinder, and to the pilot means, for controlling the admission of liquid to, and the discharge of liquid from, the power cylinder, and means operatively connected to the hydraulic reversing member, for varying the delivery of the subsidiary pump to the hydraulic pilot means during the reversing period of the piston.

8. In a fluid control system for hydraulic motors, a principal pump, means for operating the principal pump, a principal conduit connected to the principal pump, a subsidiary pump operatively connected to the principal pump, a subsidiary conduit branched from the principal conduit and connected to the suction side of the subsidiary pump, a power cylinder, a piston in the cylinder, hydraulic pilot means connected to the delivery side of the subsidiary pump, means controlled by the piston for operating the pilot means in time with the reciprocation of the piston, a hydraulic reversing member connected to the principal conduit, to the power cylinder, and to the pilot means, for controlling the admission of liquid to, and the discharge of liquid from, the power cylinder, and means operatively connected to the hydraulic reversing member, for varying the delivery of the subsidiary pump to the hydraulic pilot means, so as to increase, and then to reduce, the delivery of the subsidiary pump during the operation of the hydraulic reversing means.

9. In a fluid control system for hydraulic motors, a principal pump, means for operating the principal pump, a principal conduit connected to the principal pump, a subsidiary pump operatively connected to the principal pump, a subsidiary conduit branched from the principal conduit and connected to the suction side of the subsidiary pump, a power cylinder, a piston in the cylinder, hydraulic pilot means connected to the delivery side of the subsidiary pump, means controlled by the piston for operating the pilot means in time with the reciprocation of the piston, a hydraulic reversing member connected to the principal conduit, to the power cylinder, and to the pilot means, for controlling the admission of liquid to, and the discharge of liquid from, the power cylinder, and a cam operatively connected to the reversing hydraulic member, for varying the delivery of the subsidiary pump to the hydraulic pilot means during the reversing period of the piston.

HEINR. FEILKAS.